(12) United States Patent
Clark

(10) Patent No.: US 6,793,134 B2
(45) Date of Patent: Sep. 21, 2004

(54) SELF-SERVICE TERMINAL

(75) Inventor: Barrie Clark, Dundee (GB)

(73) Assignee: NCR Corporation, Dayton, OH (US)

( * ) Notice: Subject to any disclaimer, the term of this patent is extended or adjusted under 35 U.S.C. 154(b) by 0 days.

(21) Appl. No.: 10/610,027

(22) Filed: Jun. 30, 2003

(65) Prior Publication Data

US 2004/0020984 A1 Feb. 5, 2004

(30) Foreign Application Priority Data

Aug. 1, 2002 (GB) .............................. 0217846

(51) Int. Cl.⁷ .......................... G06F 17/60; G06K 5/00
(52) U.S. Cl. .................................. 235/379; 235/380
(58) Field of Search ........................ 235/379, 380, 235/383, 381, 382; 902/3; 382/115, 116; 340/5.82, 5.83, 5.84

(56) References Cited

U.S. PATENT DOCUMENTS

| | | | | |
|---|---|---|---|---|
| 5,057,677 A | * | 10/1991 | Bertagna et al. | ............ 235/380 |
| 6,016,476 A | | 1/2000 | Maes et al. | |
| 6,305,603 B1 | * | 10/2001 | Grunbok et al. | ............ 235/379 |
| 6,484,936 B1 | * | 11/2002 | Nicoll et al. | ................ 235/379 |
| 6,547,130 B1 | * | 4/2003 | Shen | .......................... 235/380 |
| 6,702,181 B2 | * | 3/2004 | Ramachandran | ............ 235/380 |
| 2001/0011680 A1 | * | 8/2001 | Solitesz et al. | ............. 235/379 |
| 2003/0129965 A1 | * | 7/2003 | Siegel | ......................... 455/411 |

FOREIGN PATENT DOCUMENTS

| EP | 0 379 333 A1 | 7/1990 |
|---|---|---|
| GB | 2 374 711 A | 10/2002 |

* cited by examiner

Primary Examiner—Michael G. Lee
Assistant Examiner—April A. Taylor
(74) Attorney, Agent, or Firm—Michael Chan

(57) ABSTRACT

A self-service terminal (12) having a wireless communication port (28) for interacting with a user's portable device (60 or 70) is described. The terminal (12) may be an ATM, and includes a biometric device (35) for capturing biometric data from a user at the terminal (12). The terminal (12) is operable to receive biometric data from portable devices (60 or 70) within the vicinity (76) of the terminal (12), and compares the received biometric data with data captured by the biometric device (35) to determine which portable device (60 or 70) is associated with the user at the terminal (12). A method of executing a transaction at a self-service terminal (12) having a wireless communications port (28) is also described.

15 Claims, 2 Drawing Sheets

SELF-SERVICE TERMINAL

BACKGROUND OF THE INVENTION

The present invention relates to a self-service terminal (SST), such as an automated teller machine (ATM).

ATMs are public access terminals that provide users with a secure, reliable, and convenient source of cash and other financial transactions in an unattended environment.

Recently, ATMs have been provided with wireless communications ports for receiving transactions from a user's portable device (such as a portable digital assistant (PDA) or a cellular radio-frequency telephone). This enables a user to enter a transaction via the portable device's user interface (keypad and screen, or touchscreen) rather than via the ATM's user interface. This also allows a user to enter and store a transaction in a portable device prior to arriving at an ATM, thereby reducing the transaction time at the ATM. A further advantage is that ATMs can be provided with minimal user interfaces, as the users' portable devices function as ATM user interfaces.

Although there are many advantages in using a portable device to enter a transaction, there is also a disadvantage. If there are a plurality of wireless devices in the vicinity of an ATM, then the ATM is not able to determine if a transaction received from a wireless device and about to be executed by the ATM was transmitted by the person currently in front of the ATM. This may result in an ATM dispensing cash to the wrong person, that is, to a person who did not enter the cash withdrawal transaction but who is in front of the ATM when the cash withdrawal transaction is fulfilled.

SUMMARY OF THE INVENTION

It is an object of an embodiment of the present invention to obviate or mitigate the above disadvantage or other disadvantages associated with prior art self-service terminals.

According to a first aspect of the present invention there is provided a self-service terminal having a wireless communication port for interacting with a user's portable device and a biometric device for capturing biometric data from a user at the terminal, the terminal being operable to receive biometric data from portable devices within the vicinity of the terminal, and to compare the received biometric data with data captured by the biometric device to determine which portable device is associated with the user at the terminal.

The biometric device may utilize: human iris recognition; facial recognition; voice recognition; finger geometry recognition; fingerprint recognition; vein pattern recognition; signature dynamics; typing dynamics; retina scan; or any other convenient biometric technique. Biometrics can be defined as using anatomical, physiological, or behavioral characteristics to recognize, or verify the claimed identity of, an individual.

The biometric data may be stored by the portable device, or it may be stored on a network and downloaded by the portable device when required.

Preferably, biometric data is stored in the form of a biometric template for a particular type of biometric device.

In some embodiments, multiple biometric templates may be stored for each user, where each template relates to a different type of biometric device. For example, the following biometric templates may be stored for each user: an iris template, a fingerprint template, a voice template, and such like.

Where multiple types of biometric templates are stored, the terminal may indicate the type of biometric template required when requesting biometric information from the portable devices in the vicinity of the terminal.

In some embodiments, a portable device may store biometric templates for different users, so that a user logs in to the portable device before the portable device transmits a biometric template. This enables a portable device that is shared by a plurality of users (for example, a cellular radio-frequency telephone (hereinafter referred to as a "cellphone") used by different members of a family) to be used in a transaction.

The portable device may be a cellphone, a PDA, a converged PDA/cellphone, a Web access device, or such like.

Preferably, the portable device includes a secure storage area, such as an integrated circuit card, for securely storing the user's biometric template. Alternatively, the portable device has secure access (for example, an encrypted data connection) to a remote secure storage area for storing the user's biometric template.

The terminal may be an ATM, an information kiosk, or such like.

By virtue of this aspect of the invention, an ATM is able to determine if the portable device communicating with the ATM is being used by the person directly in front of the ATM. This avoids the ATM dispensing cash to a person other than the person using the ATM.

One advantage of this invention is that the terminal does not permanently store biometric templates for users, as these templates are stored (or accessed) by the portable devices and only transmitted to the terminal when a verification comparison is required. This may allay reservations some users have about privacy.

According to a second aspect of the present invention there is provided a method of executing a transaction at a self-service terminal having a wireless communications port, the method comprising the steps of capturing biometric data from a user at the terminal, receiving biometric data from portable devices within the vicinity of the terminal, and comparing the received biometric data with the data captured by the biometric device to determine which portable device is associated with the user at the terminal.

The method may include the further step of requesting transmission of biometric data from portable devices within the vicinity of the terminal. This request may be in the form of a broadcast.

By virtue of this aspect of the present invention, the SST is able to identify the portable device carried by the person in front of the SST, and to fulfil the transaction transmitted from that device.

According to a third aspect of the present invention there is provided a self-service terminal having a biometric device, the terminal including means for matching received biometric data with data captured by the biometric device to determine which portable device is associated with a user at the terminal.

BRIEF DESCRIPTION OF THE DRAWINGS

These and other aspects of the present invention will be apparent from the following specific description, given by way of example, with reference to the accompanying drawings, in which.

DETAILED DESCRIPTION

Figure 1:
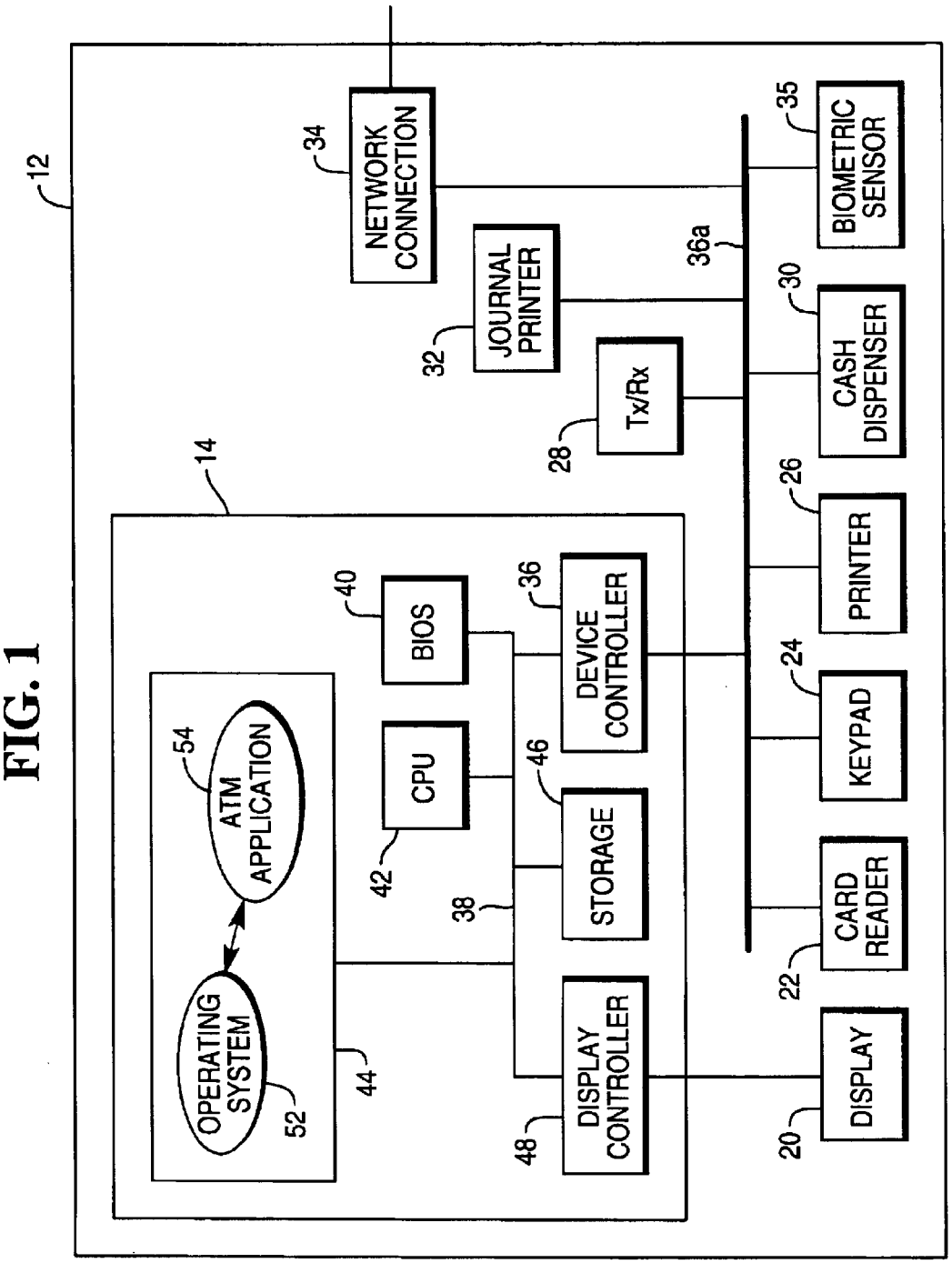
FIG. 1 is a block diagram of a self-service terminal according to one embodiment of the present invention.

Reference is now made to FIG. 1, which is a simplified block diagram of the architecture of an SST 12 (in the form of an ATM) according to one embodiment of the present invention.

The ATM 12 comprises a plurality of modules for enabling transactions to be executed and recorded by the ATM 12. These ATM modules comprise: a controller module 14, a display module 20, a card reader/writer module 22, an encrypting keypad module 24, a receipt printer module 26, a wireless communications module 28 including a Bluetooth (trade mark) transceiver, a cash dispenser module 30, a journal printer module 32 for creating a record of every transaction executed by the ATM 12, a network connection module 34 for accessing a remote authorization system (not shown), and a biometric capture module 35 in the form of a fingerprint sensor.

The controller 14 comprises a BIOS 40 stored in non-volatile memory, a microprocessor 42, associated main memory 44, storage space 46 in the form of a magnetic disk drive, and a display controller 48 in the form of a graphics card.

The display module 20 is connected to the controller module 14 via the graphics card 48 installed in the controller module 14. The other ATM modules (22 to 35) are connected to the ATM controller 14 via a device controller 36, device bus 36a, and one or more internal controller buses 38.

The Bluetooth wireless module 28 implements a device discovery procedure to detect any Bluetooth-enabled devices in the vicinity of the wireless module 28 that are in a discoverable mode.

In use, the main memory 44 is loaded with an ATM operating system kernel 52, and an ATM application 54. As is well known in the art, the operating system kernel 52 is responsible for memory, process, task, and disk management. The ATM application 54 is responsible for controlling the operation of the ATM 12. In particular, the ATM application 54 provides the sequence of screens used in each transaction (referred to as the application flow); monitors the condition of each module within the ATM (state of health monitoring); and obtains authorization for transactions from a remote transaction authorization server (not shown).

The term "screen" is used herein to denote the graphics, text, controls (such as menu options), and such like, that are presented on an SST display; the term "screen" as used herein does not refer to the hardware (that is, the display) that presents the graphics, text, controls, and such like. Typically, when a transaction is being entered at an SST, a series of screens are presented in succession on the SST display, the next screen displayed being dependent on a user entry or activity relating to the current screen. For example, a first screen may request a user to insert a card; once a card has been inserted a second screen may invite the user to enter his/her PIN; once the final digit of the PIN has been entered, a third screen may invite the user to select a transaction; and so on.

Figure 2:
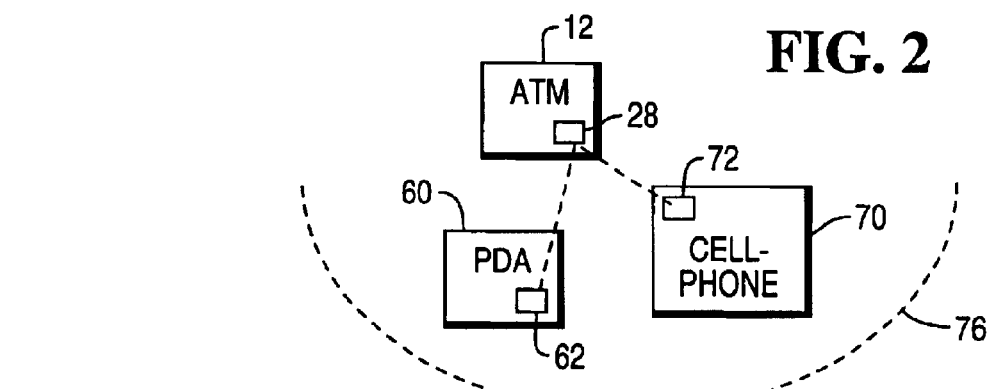
FIG. 2 is a schematic diagram of a user's portable device in the vicinity of the terminal of FIG. 1.

Reference is now also made to FIG. 2, which is a schematic diagram of a first person's portable device 60 and a second person's portable device 70 in the vicinity of the ATM 12 of FIG. 1.

The first device 60 is a Bluetooth-enabled PDA carried by a first person who is using the ATM 12. The PDA 60 includes a Bluetooth transceiver 62 in discoverable mode. In this embodiment, the PDA is a Palm (trade mark) m515 (trade mark) handheld having a Bluetooth card.

The second device 70 is a cellphone having a Bluetooth transceiver 72 in discoverable mode. The second device is carried by the second person who is standing to one side of the first person (the ATM user). In this embodiment, the cellphone is a Nokia (trade mark) 8910 (trade mark) cellphone.

The ATM user is entering a transaction using the PDA 60, but the second person's cellphone 70 is closer to the ATM 12 than the PDA 60, and the second person has already completed and transmitted a transaction to the ATM 12 for fulfillment.

While the ATM 12 is in-service (that is, when the ATM is powered up and available for executing transactions), the ATM's wireless module 28 continually implements the device discovery procedure (according to the Bluetooth protocol) to monitor the area in the immediate vicinity of the ATM 12 (approximately 10 m radius as illustrated by arc 76 in FIG. 2) for portable devices having a Bluetooth transceiver in discoverable mode.

Figure 3:
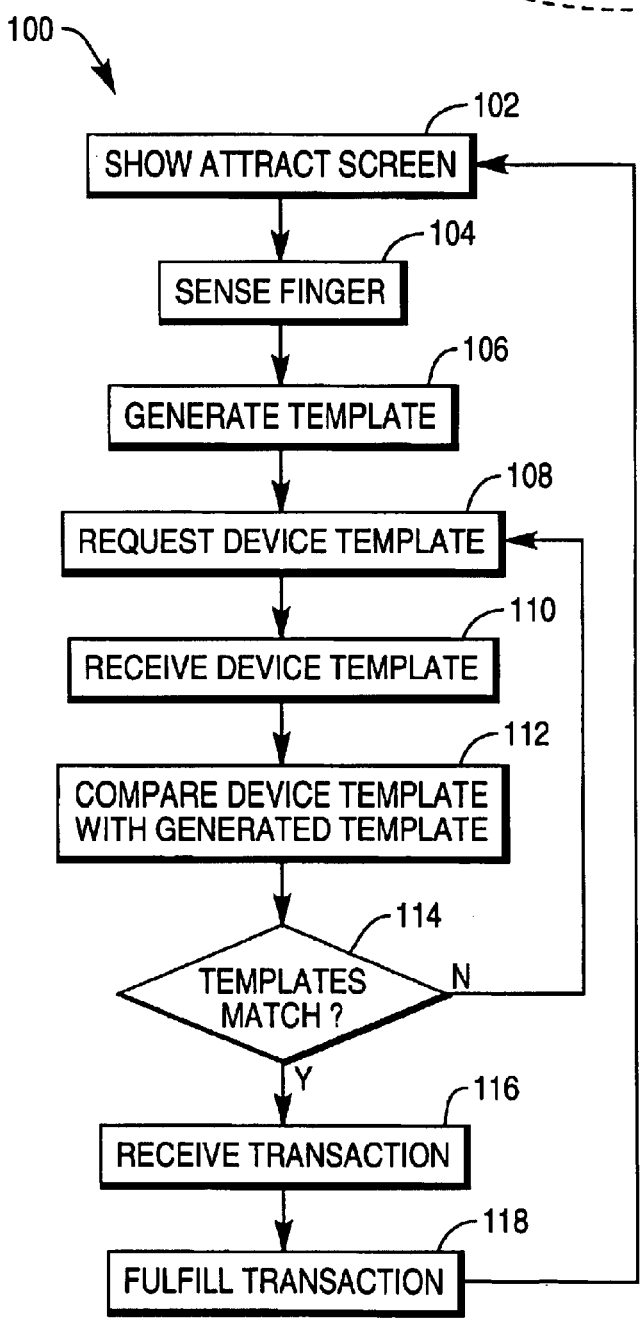
FIG. 3 is a flowchart illustrating the steps involved in fulfilling a transaction at the terminal of FIG. 1.

Reference is now made to FIG. 3, which is a flowchart 100 illustrating the steps involved in a cash withdrawal transaction at ATM 12 using a portable device 60 or 70. Initially, the ATM 12 displays an attract screen (step 102) to invite passers by to use the ATM 12.

To withdraw cash from the ATM 12 using the PDA 60, the first person approaches the ATM 12 and places his/her finger on the fingerprint sensor 35. The ATM 12 captures an image of the person's finger (step 104) and generates a biometric template from features of the person's fingerprint image (step 106). Fingerprint biometric modules are well known and will not be described in detail herein. One suitable type of fingerprint module is the Tactilesense (trade mark) T-FPM (trade mark) fingerprint sensor module, available from Ethentica by Security First Corporation, 22362 Gilberto #130, Rancho Santa Margarita, Calif., 92688, U.S.A.

The ATM 12 then requests a template from any portable devices in the vicinity of the ATM 12 (step 108). This may be achieved by the wireless communication module 28 broadcasting a request to all devices in the vicinity; or alternatively, by the wireless communication module discovering (using the Bluetooth protocol) devices in the vicinity and sending a request to each discovered device in turn. The request includes an indication that the ATM 12 would like to receive a fingerprint template from the device. In this embodiment, the ATM 12 sends a separate request to each discovered device.

Device discovery works as follows. When the cellphone 70 enters the ATM's vicinity 76, the cellphone's transceiver 72 detects a device discovery procedure executed by the ATM's wireless module 28. The cellphone's transceiver 72 responds to this device discovery procedure by transmitting parameter information relating to the device 70. On receiving this parameter information from the celiphone's transceiver 72, the ATM's wireless module 28 analyses the types of services offered by the transceiver 72 and determines that the cellphone 70 can be used to enter a transaction, so the ATM's wireless module 28 establishes a connection with the celiphone's transceiver 72 using pairing, according to the Bluetooth protocol.

As two devices 60 and 70 are discovered by the ATM 12, the ATM 12 sends a request to one of the devices. In this embodiment, the ATM 12 sends a request to cellphone 70 because it is detected as closer to the ATM 12 than PDA 60 (based on transmitted signal strength), and therefore more likely to be the device that is being carried by the ATM user.

The cellphone 70 receives the request for a fingerprint template, and transmits its stored fingerprint template to the ATM 12 either immediately, or after obtaining permission to transmit from the person carrying the cellphone 70.

The ATM 12 receives the transmitted fingerprint template from the cellphone 70 (step 110), and compares (step 112) the transmitted template with the template generated by the ATM 12 in step 106.

In this example, the templates will not match (step 114) so the ATM 12 erases the received template and reverts to step 108 to request a fingerprint template from the other device in the vicinity, which is the PDA 60.

The PDA 60 receives the request for a fingerprint template, and transmits its stored fingerprint template to the ATM 12 either immediately, or after obtaining permission to transmit from the person carrying the PDA 60.

The ATM 12 receives the transmitted fingerprint template from the PDA 60 (step 110), and compares (step 112) the transmitted template with the template generated by the ATM 12 in step 106.

In this example, the templates should match (step 114) so the ATM 12 proceeds to receive a complete transaction, or a series of transaction commands to form a complete transaction, from the PDA 60 (step 116), and then fulfils the received transaction (step 118).

As each Bluetooth device has a unique Bluetooth device address, a secure connection can be established between the portable device 60 or 70 and the ATM 12, such that other Bluetooth devices in the vicinity 76 of the ATM 12 cannot be party to the communication. Once the ATM 12 has matched a received template with the template generated from the person at the ATM 12, then the ATM 12 can associate the Bluetooth device address with the person at the ATM 12, thereby enabling the ATM 12 to fulfil the correct transaction.

Once the transaction has been fulfilled, the ATM 12 erases the received template and the generated template, and reverts to displaying the attract screen (step 102).

One advantage of requesting only one template at a time until a match is found, is that this reduces the number of times a portable device must transmit its stored biometric template, particularly if the ATM 12 is able to detect which portable device is closest, for example, using transmitted signal strength. This may reduce security and privacy concerns about transmitting a biometric template.

It will now be appreciated that this embodiment has the advantage that when a plurality of wireless devices are in the vicinity of an ATM 12, the ATM 12 can determine which wireless device is in front of the ATM, and can use this information to fulfil the correct transaction.

This embodiment also has the advantage that the ATM 12 does not permanently store a biometric template. The ATM 12 only stores a generated template and a received template temporarily to associate a portable device with a person at the ATM 12.

Various modifications may be made to the above described embodiments within the scope of the invention, for example, in other embodiments, the terminal may be a Point of Sale terminal, a non-cash kiosk, or such like. In other embodiments, the wireless communications port may implement a wireless protocol other than Bluetooth, for example, 802.11b, IrDA, or such like.

In other embodiments, the wireless module 28 may require wireless devices 60,70 to indicate the power level they transmit at, so that the ATM 12 can distinguish between a weak transmission that is near the ATM, and a powerful transmission that is further away from the ATM.

In other embodiments, if only one wireless device is detected in the vicinity of the terminal, the ATM may not request a template to verify that the user is in front of the ATM. This may be implemented if the terminal can only receive transactions via a wireless connection (for example, if an ATM does not have a conventional user interface).

In other embodiments, an SST may operate in discoverable mode, and a portable device may initiate discovery of the SST.

In other embodiments, the portable device 60 or 70 may not store a biometric template, but may download the biometric template from a secure store when required.

In other embodiments, the ATM 12 may broadcast a request for templates to any portable devices in the vicinity of the ATM 12. The ATM 12 may receive a plurality of templates, and compare each of these received templates with the generated template in turn until a match is found.

What is claimed is:

1. A method of operating a self-service terminal, the method comprising:

capturing first biometric data from a user at the terminal;

after the first biometric data has been captured, transmitting a request to a plurality of portable devices within the vicinity of the terminal for biometric data from the portable devices;

receiving second biometric data from each of the plurality of portable devices; and comparing the first biometric data with the second biometric data from at least one of the plurality of portable devices to determine which one of the plurality of portable devices is associated with the user at the terminal.

2. A method of operating an automated teller machine (ATM) at which an ATM customer carrying a portable device can carry out an ATM transaction, the method comprising:

capturing first biometric data from the ATM customer at the ATM;

after the first biometric data has been captured, transmitting a request to a plurality of portable devices including the portable device carried by the ATM customer within the vicinity of the ATM for biometric data from the portable devices; receiving second biometric data from each of the plurality of portable devices including the portable device carried by the ATM customer; and comparing the first biometric data with the second biometric data from at least one of the plurality of portable devices including the portable device carried by the ATM customer to determine which one of the plurality of portable devices is associated with the ATM customer at the ATM.

3. A self-service terminal comprising:

a communication port for interacting with a portable device;

a biometric device for capturing first biometric data from a user at the terminal;

means for, after the first biometric data has been captured, transmitting via the communication port a request to a plurality of portable devices within the vicinity of the terminal for biometric data from the portable devices;

means for receiving via the communication port second biometric data from each of the plurality of portable devices; and means for comparing the first biometric data with the second biometric data from at least one of the plurality of portable devices to determine which one of the plurality of portable devices is associated with the user at the terminal.

4. A terminal according to claim 3, wherein the request to the plurality of portable devices is transmitted at the same time to each of the plurality portable devices.

5. A terminal according to claim 3, wherein the request to the plurality of portable devices is transmitted in sequence to each of the plurality portable devices.

6. A terminal according to claim 3, further comprising means for storing multiple biometric templates for each user, each template relating to a different type of biometric device.

7. A terminal according to claim 6, farther comprising means for indicating the type of biometric template required when biometric data from the plurality of portable devices in the vicinity of the terminal is requested.

8. A terminal according to claim 3, wherein the communication port comprises a wireless communication port.

9. An automated teller machine (ATM) comprising:

a communication port for interacting with a portable device;

a biometric device for capturing first biometric data from an ATM customer at the ATM;

means for, after the first biometric data has been captured, transmitting via the communication port a request to a plurality of portable devices within the vicinity of the ATM for biometric data from the portable devices;

means for receiving via the communication port second biometric data from each of the plurality of portable devices; and means for comparing the first biometric data with the second biometric data from at least one of the plurality of portable devices to determine which one of the plurality of portable devices is associated with the ATM customer at the ATM.

10. An ATM according to claim 9, wherein the request to the plurality of portable devices is transmitted at the same time to each of the plurality portable devices.

11. An ATM according to claim 9, wherein the request to the plurality of portable devices is transmitted in sequence to each of the plurality portable devices.

12. An ATM according to claim 9, further comprising means for storing multiple biometric templates for each ATM customer, each template relating to a different type of biometric device.

13. An ATM according to claim 12, further comprising means for indicating the type of biometric template required when biometric data from the plurality of portable devices in the vicinity of the ATM is requested.

14. An ATM according to claim 9, wherein the communication port comprises a wireless communication port.

15. A self-service terminal having a biometric device for capturing biometric data from a user, the terminal comprising:

means for transmitting a request to a plurality of portable devices within the vicinity of the terminal for biometric data from the portable devices;

means for receiving biometric data from each of the plurality of portable devices; and means for matching the captured biometric data with the biometric data received from at least one of the plurality of portable devices to determine which one of the plurality of portable devices is associated with the user at the terminal.

* * * * *